(12) United States Patent  
Duenyas et al.

(10) Patent No.: US 9,538,542 B2  
(45) Date of Patent: *Jan. 3, 2017

(54) METHOD AND SYSTEM OF INTERFERER SIGNAL DETECTION

(71) Applicant: SPARKMOTION INC., Ottawa (CA)

(72) Inventors: Izhak Duenyas, Rechovot (IL); Ziv Dashevsky, Petach-Tikva (IL); David Cohen, Petach-Tikva (IL)

(73) Assignee: SPARKMOTION INC., Ottawa (CA)

( * ) Notice: Subject to any disclaimer, the term of this patent is extended or adjusted under 35 U.S.C. 154(b) by 821 days.

This patent is subject to a terminal disclaimer.

(21) Appl. No.: 13/917,353

(22) Filed: Jun. 13, 2013

(65) Prior Publication Data

US 2013/0279484 A1 Oct. 24, 2013

Related U.S. Application Data

(63) Continuation of application No. 12/791,890, filed on Jun. 2, 2010, now Pat. No. 8,488,568.

(60) Provisional application No. 61/213,358, filed on Jun. 2, 2009.

(51) Int. Cl.
| *H04L 12/28* | (2006.01) |
| *H04W 72/08* | (2009.01) |
| *H04J 1/16*  | (2006.01) |
| *H04W 16/14* | (2009.01) |

(52) U.S. Cl.
CPC .......... *H04W 72/082* (2013.01); *H04W 16/14* (2013.01)

(58) Field of Classification Search
USPC ................. 370/337, 252, 278, 442
See application file for complete search history.

(56) References Cited

U.S. PATENT DOCUMENTS

| 5,594,720 | A  |   | 1/1997  | Papadopoulos et al. |
| 6,567,416 | B1 | * | 5/2003  | Chuah ................ H04L 12/2602 |
|           |    |   |         | 370/347 |
| 6,650,905 | B1 |   | 11/2003 | Toskala et al. |
| 8,320,947 | B2 | * | 11/2012 | Hulkkonen .......... H04B 1/1027 |
|           |    |   |         | 370/329 |
| 2008/0069013 | A1 | * | 3/2008  | Monier ................. G01D 4/004 |
|              |    |   |         | 370/277 |
| 2008/0130593 | A1 | * | 6/2008  | Scheinert ............... H04W 8/30 |
|              |    |   |         | 370/337 |
| 2009/0290514 | A1 |   | 11/2009 | Muharemovic |

\* cited by examiner

*Primary Examiner* — John Pezzlo  
(74) *Attorney, Agent, or Firm* — Procopio, Cory, Hargreaves & Savitch LLP

(57) ABSTRACT

A method for detecting an interferer signal in a duplex communication channel. The method comprises establishing a duplex communication channel for transmitting and receiving a signal having a plurality of frames each comprising an uplink (UL) and a downlink (DL) sub frames, allocating a plurality of silent slots in at least on of the UL and DL sub frames of at least some of the plurality of frames, intercepting at least one transmission signal during the plurality of silent slots, and detecting at least one interferer signal according to the at least one transmission signal.

23 Claims, 10 Drawing Sheets

| Frame structure | |
|---|---|
| Frame (msec) | 5 |
| DL % | 43% |
| UL+Listen zones % | 57% |
| DL msec | 2.15 |
| UL+Listen msec | 2.85 |
| Preamble | 1 |
| DL slots | 18 |
| UL Slots | 18 |
| Silent slots | 10 |

| Radar signal | |
|---|---|
| Pulse width (msec) | 0.001 |
| PRI (msec) | 0.333 |
| Pulse per burst | 9 |
| Total burst Length | 2.65 |

| Detection | |
|---|---|
| Pulse required for detection | 4 |
| Signal length - required for detection (msec) | 1 |
| Start detection (in frame) | 0.485 |
| End detection (in frame) | 4 |
| Detection probability | 70% |

| Frame structure | |
|---|---|
| Frame (msec) | 5 |
| DL % | 48% |
| UL+Listen zones % | 52% |
| DL msec | 2.4 |
| UL+Listen msec | 2.6 |
| Preamble | 1 |
| DL slots | 22 |
| UL Slots | 18 |
| Silent slots | 6 |

| Radar | |
|---|---|
| Pulse (msec) | 0.020 |
| PRI (msec) | 0.222 |
| Pulse per burst | 9 |
| Total burst Length | 1.798 |

| Detection | |
|---|---|
| Pulse required for detection | 4 |
| Signal length - required for detection (msec) | 0.69 |
| Start detection (in frame) | 1.29 |
| End detection (in frame) | 4.31 |
| Detection probability | 60% |

FIG. 4

| Radar Type | Pulse Width (μs) | PRI (μs) | Pulses | Minimum Percentage of Successful Detection | Minimum Trials |
|---|---|---|---|---|---|
| 1 | 1 | 1428 | 18 | 60% | 30 |
| 2 | 1-5 | 150-230 | 23-29 | 60% | 30 |
| 3 | 6-10 | 200-500 | 16-18 | 60% | 30 |
| 4 | 11-20 | 200-500 | 12-16 | 60% | 30 |
| Aggregate (Radar Types 1-4) | | | | 80% | 120 |

| Radar Type | Bursts | Pulses per Burst | Pulse Width (μs) | Chirp Width (MHz) | PRI (μs) | Minimum Percentage of Successful Detection | Minimum Trials |
|---|---|---|---|---|---|---|---|
| 5 | 8-20 | 1-3 | 50-100 | 5-20 | 1000-2000 | 80% | 30 |

| Radar Type | Pulse Width (μs) | PRI (μs) | Burst Length (ms) | Pulses per Hop | Hop Rate (kHz) | Minimum Percentage Successful Detection | Min. Trials |
|---|---|---|---|---|---|---|---|
| 6 | 1 | 333 | 300 | 9 | 0.333 | 70% | 30 |

FIG. 5

| Radar Type | Pulse Width (μs) | PRF | Pulses | Minimum Percentage of Successful Detection |
|---|---|---|---|---|
| PRF Radar | | | | |
| 1 | 1 | 700 | 18 | In Service: 60%; CAC: 99% |
| 2 | 0.8-5 | 200-1000 | 10 | In Service: 60%; CAC: 99% |
| 3 | 0.8-15 | 200-1600 | 15 | In Service: 60%; CAC: 99% |
| 4 | 0.8-15 | 2300-4000 | 25 | In Service: 60%; CAC: 99% |
| | 20-30 | 2000-4000 | 20 | In Service: 60%; CAC: 99% |

| Radar Type | Pulse Width (μs) | PRF | No of PRF | Pulses per PRF | Minimum Percentage of Successful Detection |
|---|---|---|---|---|---|
| 5 | 0.8-2 | 300-400 | 2/3 | 10 | In Service: 60%; CAC: 99% |
| 6 | 0.8-2 | 400-1200 | 2/3 | 10 | In Service: 60%; CAC: 99% |

FIG. 6

| Radar Type | Pulse Width (μs) | PRF | Pulses | Minimum Percentage of Successful Detection |
|---|---|---|---|---|
| 1 | 1 | 750 | 15 | In Service: 60% |
| 2 | 1,2,5 | 200,300,500,800,1000 | 10 | In Service: 60% |
| 3 | 10,15 | 200,300,500,800,1000 | 15 | In Service: 60% |
| 4 | 1,2,5,10,15 | 1200,1500,1600 | 15 | In Service: 60% |
| 5 | 1,2,5,10,15 | 2300,3000,3500,4000 | 25 | In Service: 60% |
| 6 | 20,30 | 2300,3000,4000 | 20 | In Service: 60% |

FIG. 7

| Radar Type | Pulse Width (μs) | PRF | Pulses per burst Burst per trial Burst interval | Minimum Percentage of Successful Detection |
|---|---|---|---|---|
| FH1 | 1 | 3000 | 9 pulse/burst 8 burst/trial BI = 1.25ms increase with 1.25 ms per trial | 10 MHZ In Service: 60% 20 MHZ In Service: 70% |
| FH2 | 20 | 4500 | 9 pulse/burst 8 burst/trial BI = 5ms increase with 5 ms per trial | 10 MHZ In Service: 60% 20 MHZ In Service: 70% |

FIG. 8

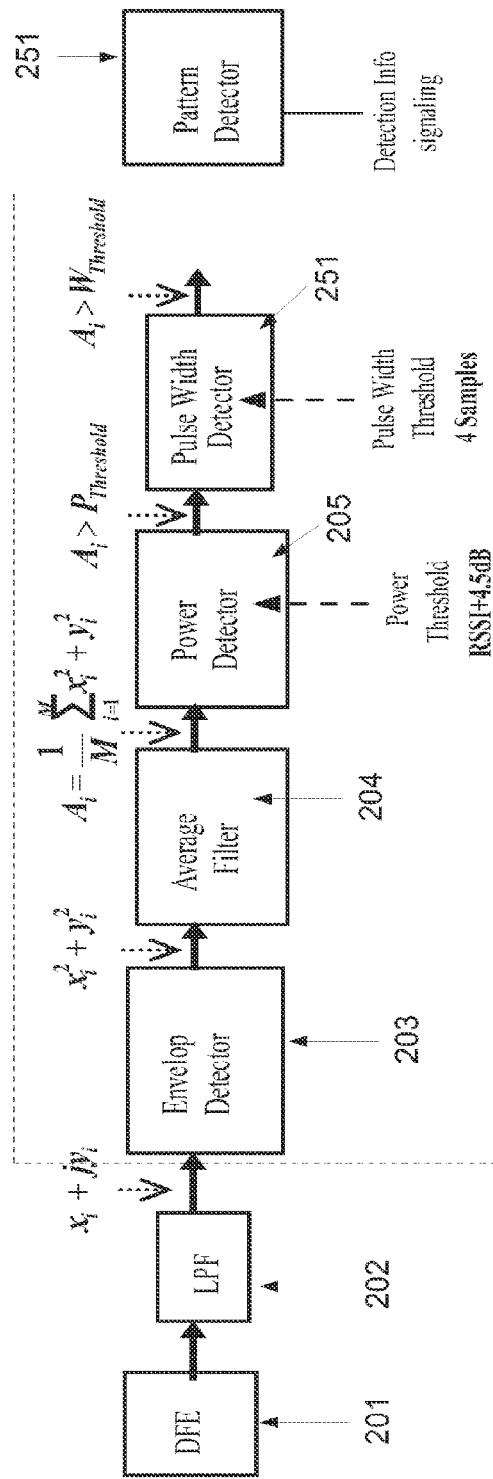
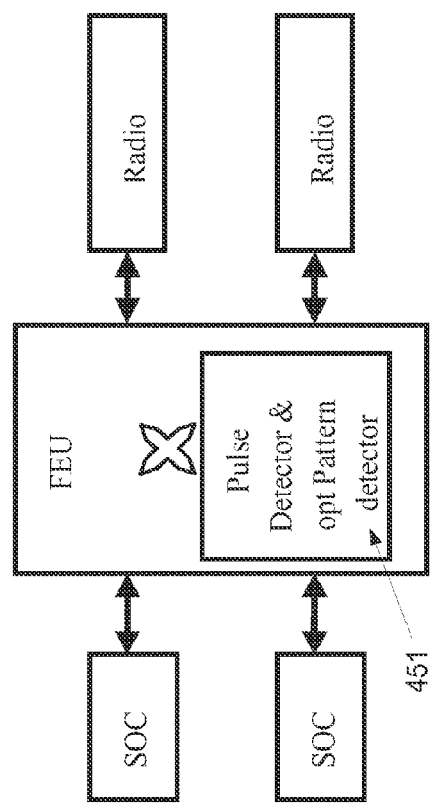
FIG. 9
FIG. 10

| DFS Channels Table | | |
|---|---|---|
| Frequency | Radar Detected Time | Last Clear Channel Test |
| | | |
| | | |
| | | |
| | | |
| | | |

FIG. 13

METHOD AND SYSTEM OF INTERFERER SIGNAL DETECTION

RELATED APPLICATION

This application is a continuation application of U.S. application Ser. No. 12/791,890 filed Jun. 2, 2010, which claims the benefit of priority under 35 USC 119(e) of U.S. Provisional Patent Application No. 61/213,358 filed Jun. 2, 2009, the contents of which are incorporated herein by reference in their entirety.

FIELD AND BACKGROUND OF THE INVENTION

The present invention, in some embodiments thereof, relates to method and system for detecting interferences and, more particularly, but not exclusively, to method and system for detecting interferences in wireless communication.

The reduction or prevention of interference between various communication networks, such as civilian and government communication and navigation systems, is a continuing challenge to operators of wireless systems. In some regions, it is required by regulations to ensure that wireless access equipment does not interfere with certain radar systems in the 5 GHz band. In case radar is being detected, the wireless access network should move automatically to a frequency that does not interfere with the radar system. In some regions and bands like 900 MHz, 2.4 GHz, 2.5 GHz, 3.6 GHz, 5.x GHz and the like there is a media sharing by some operators and/or systems. In this case, interference detection and mitigation is required to ensure the service to the users by selection of a more quite frequency.

This challenge also exists in duplex communication systems in which a single duplex communication channel is used for transmitting and receiving a signal having a plurality of frames each comprising an uplink (UL) and a downlink (DL) sub frames, for example time division duplexing (TDD) systems. For clarity, TDD systems are based on an application of time-division multiplexing to separate outward and return signals. Using the TDD communication, a single frequency channel is assigned to both the transmitter and the receiver. Both the UL and DL traffic use the same frequency but at different times. In effect, TDD divides the data stream into frames and, within each frame, assigns different time slots to the forward and reverse transmissions. The TDD scheme may allocate the amount of time slots assigned to UL and DL in a dynamic and/or static manner. It should be noted that when the TDD communication is used for providing communication in a point to multi point services, such as local phone, internet access and the like, longer time slots are allocated for receiving DL transmission then for transmitting UL data. For example, the DL/UL ratio defined in IEEE 802.16 Standard allows a maximum UL ratio is limited to a ratio of 26:21 where the actual used TDD ratio is 29:18 that allows: 60% DL and 40% UL.

The requirement to detect radar signals and adjust communication accordingly is expressed in the communication standards, for example in standard 802.11, which is a set of standards created by the institute of electrical and electronics engineers (IEEE), govern wireless networking transmission methods and have several versions, such as the well-known 802.11a-g, which are used to provide wireless connectivity. An amendment to the 802.11 standard, called 802.11h, prevents wireless networks from obstructing radar, earth exploration satellite service (EESS), and space research service (SRS) transmission. The 802.11h amendment calls for, among other things, wireless local area networks (WLANs) and other devices to detect the presence of radar activity and to protect them from interference by avoiding operation on their communication channel or reducing transmission power.

In another standard, ETSI EN 301 893 V0.r, a dynamic frequency selection (DFS) mechanism is designed to detect and avoid operation in channels with radar activity. The DFS mechanism is fully controlled by an access unit (AU). When the DFS mechanism is enabled, the AU monitors the spectrum continuously, searching for signals with a specific pattern indication radar activity. Upon detecting radar activity, or interference activities the AU immediately informs the subscriber unit (SU), stops transmitting on this frequency and starts looking for another radar-free frequency.

It is possible that the CPE also will detect a Radar system and will try to move to other AU's frequency or will inform to the AU upon the Radar detection and will shut down for a while. The AU may use this information reported by the CPE to move to other not interfered frequency. The AU maintains a continuously updated database of all applicable frequencies, where each frequency is marked as Radar/Interferer Free, Radar/Interferer Detected or Adjacent to Radar/Interferer. The AU attempts to check a new frequency only if it is marked as Radar/Interferer Free. If a Radar/Interferer activity was detected on a certain frequency, it will be marked in the database as a Radar/Interferer Detected frequency. The AU will not attempt to check for radar activity in frequencies marked as Radar Detected. A certain time after detecting radar activity on a frequency, it will be removed from the list of Radar/Interferer Detected frequencies and will be marked as Radar/Interferer Free.

There are solutions for handling these interferences. For example as described in US Patent Application Pub. No. 2009/0086684, published on Apr. 2, 2009 that describes a method for preventing co-channel operation with a radar system includes the steps of setting a state of a first communication channel to active, connecting to a first wireless access point on the first communication channel, passively scanning at least a second communication channel for communication from a second wireless access point, setting a state of the second channel to active if frames are received on the second channel, determining whether an elapsed time since frames were received on at least one of the first channel and the second channel has exceeded a predefined value, and in response to the predefined value being exceeded for at least one of the first channel and the second channel, setting the state of a corresponding one of the first channel and the second channel to passive.

SUMMARY OF THE INVENTION

According to some embodiments of the present invention there is provided a method for detecting an interferer signal in a duplex communication channel. The method comprises establishing a duplex communication channel for transmitting and receiving a signal having a plurality of frames each comprising an uplink (UL) and a downlink (DL) sub frames, allocating a plurality of silent slots in at least some of the plurality of frames, intercepting at least one transmission signal during the plurality of silent slots, and detecting at least one interferer signal according to the at least one transmission signal.

According to some embodiments of the present invention there is provided a wireless duplex communication system having a plurality of radio port units each including receiver-transmitter circuitry and an antenna and communicating with other of the plurality of radio port units over a duplex communication channel by transmitting a signal having a plurality of frames each comprising an uplink (UL) and a downlink (DL) sub frames; characterized in that at least one of the plurality of radio port units having a interferer signal module for detecting at least one interferer signal during a plurality of silent slots allocated in at least one of the UL and DL sub frames.

According to some embodiments of the present invention there is provided a radio port unit for wireless duplex communication. The radio port unit comprises a receiver-transmitter circuitry for communicate over a duplex communication channel by transmitting and receiving a signal having a plurality of frames each comprising an uplink (UL) and a downlink (DL) sub frames and an interferer signal module for detecting at least one interferer signal during a plurality of silent slots allocated in at least one of the UL and DL sub frames.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4 is an exemplary table detailing a calculation of a detection period for the European telecommunications standards institute (ETSI) FH-2 radar signal pattern, according to some embodiments of the present invention;

FIG. 5 is a table of exemplary radar patterns as defined according to FCC standard No. FCC-06-96A1, which is incorporated herein by reference;

FIG. 6 is a table of exemplary radar patterns as defined according to ETSI standard No. ETSI EN 301893 v1.5.1p, which is incorporated herein by reference;

FIGS. 7 and 8 are tables of exemplary radar patterns as defined in ETSI EN 301893 v1.5.1p standard EN 302502 v1.2.1 p standard, which are incorporated herein by reference;

FIG. 9 is a schematic illustration of functional blocks of a pulse detector for detecting interferer signals, according to some embodiments of the present invention;

FIG. 10 is a schematic illustration of a connection of an FEU between two SOCs and two radio an additional computation power located in the SOCs, and/or internally, optionally on the fly, by the CPU of the FEU;

FIG. 13 is a distributed file system (DFS) Channels table for documenting the detection of interferer signals, according to some embodiments of the present invention.

DESCRIPTION OF EMBODIMENTS OF THE INVENTION

Figure 1:
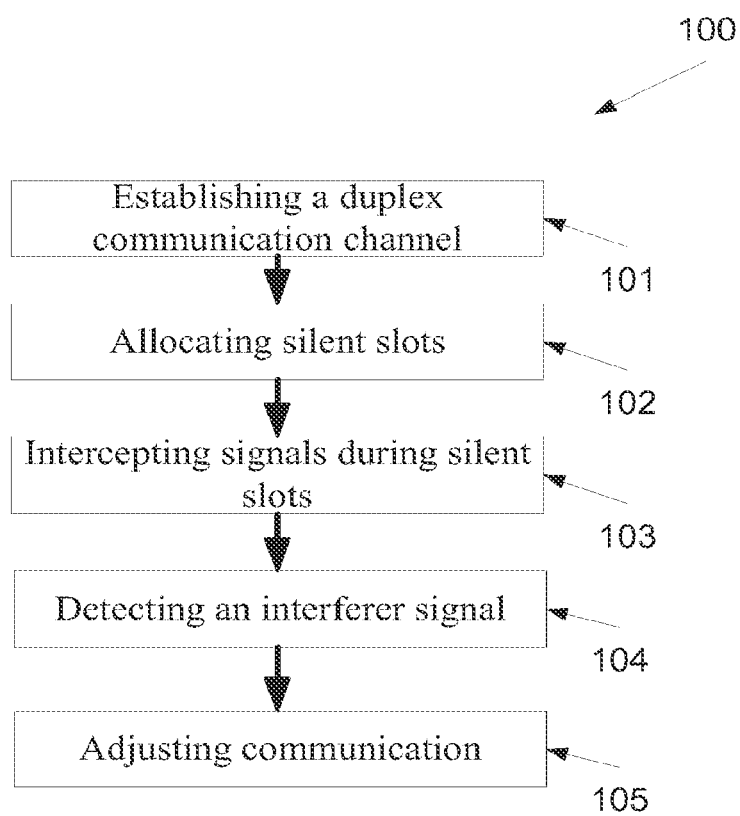
FIG. 1 is a flowchart of a method of interferer signal detection in duplex communication, according to some embodiments of the present invention.

The present invention, in some embodiments thereof, relates to method and system for detecting interferences and, more particularly, but not exclusively, to method and system for detecting interferences in wireless communication.

According to some embodiments of the present invention there is provided a wireless duplex communication system served by a plurality of radio port units, for example a base station and customer premises equipments (CPEs). Each radio port unit communicates with other radio port units over a duplex communication channel in which each a frame includes an uplink (UL) and a downlink (DL) sub frames. Some or all of the radio port units includes an interferer signal detection module, for example a field-programmable gate array (FPGA), for detecting and optionally classifying one or more interferer signals, such as radar signals. The detection is performed during silent slots which are allocated in the UL sub frame and/or in the DL sub frame of the duplex communication channel. The allocation of the silent slots allows maintaining a high detection probability, optionally of 60% or more. Furthermore, the allocation of the silent slots allows maintaining a selected ratio between the UL and the DL portions, for example 40:60. Additionally or alternatively, the allocation of the silent slots allows intercepting transmissions of neighboring systems that may use similar DL/UL schemes. The detection of interferer signals may allow estimating the quality of the duplex communication channel and/or, the quality of service that is provided over the duplex communication channel. Additionally or alternatively, a dynamic frequency selection (DFS) and/or a dynamic channel selection (DCS) are performed according to the detection and/or the classification of the interferer signals.

According to some embodiments of the present invention, there is provided a method for detecting an interferer signal in a duplex communication channel. The method is based on allocating a plurality of silent slots in UL and/or DL sub frames of a duplex communication channel, intercepting transmission signals during the silent slots, and detecting, and optionally classifying, interferer signals by analyzing the intercepted transmission signals.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a flowchart of a method of interferer signal detection in duplex communication, according to some embodiments of the present invention. The method allows interferer signal detection in wireless duplex communication systems in which radio port units communicate with one another over a duplex communication channel. For example, the method may be used in point-to-multipoint networks such as TDD systems for dividing forward and reverse communication channels on the same physical communications medium. The method may allow selecting an applicable channel and/or frequency from a plurality of possible communication channels and/or frequencies, in the light of the effect of the interferer signal. As used herein, an interferer signal means a radar signal, interference, a noise, a transmission of adjacent radio port units, such as adjacent base stations.

Optionally, the method is implemented by a FPGA that is connected to the hosting radio port unit, for example between the WiMax System On Chip (SOC) and the Radio unit, for example as shown in FIG. 10.

According to some embodiments of the present invention, the client terminal is a customer premises equipment (CPE), such as a WiMAX™ CPE, and the method is used for intercepting interferer signals during the TDD communication between a base station and one or more client terminals, such as customer-provided equipments (CPEs), for example WiMAX™ or Wi-Fi™ modems. This TDD communication is defined according to the WiMAX™ physical layer (PHY), for example as described in an IEEE 802.16e standard that is incorporated herein by reference.

First, as shown at 101, a duplex communication channel for transmitting and receiving a signal having a plurality of frames each comprising an uplink (UL) and a downlink (DL) sub frames, such as a TDD channel, is established. Using the TDD communication, a single frequency channel is assigned to both the transmitter and the receiver of an implementing radio port unit.

Then, as shown at 102, silent slots are allocated in the DL sub frames and/or the UL sub frames of frames of a duplex communication channel, such as a communication channel between a client terminal and a base station. Optionally, each silent slot lasts between 500 nanosecond (nsec) and 1000 nsec, for example 640 nsec.

As further described below, the silent slots allow intercepting, detecting, and optionally classifying, interferer signals, such as radar signals, in a selected detection probability, for example between 60% and 70%, for example as described below. Optionally, the silent slots are allocated in a manner that allows maintaining a requested DL/UL ratio, for example 60/40 DL/UL ratio (29:18 symbols) as defined in FCC radar type 6 standard and/or ETSI radar type FH-2 standard, which are incorporated herein by reference.

The silent slots may be non transmission periods, for example as defined in communication standards for license exempt bands, for example IEEE 802.16h, which is incorporated herein by reference, to allow stations based on carriers sensing to transmit over the transmission channel.

Figures 2, 3:
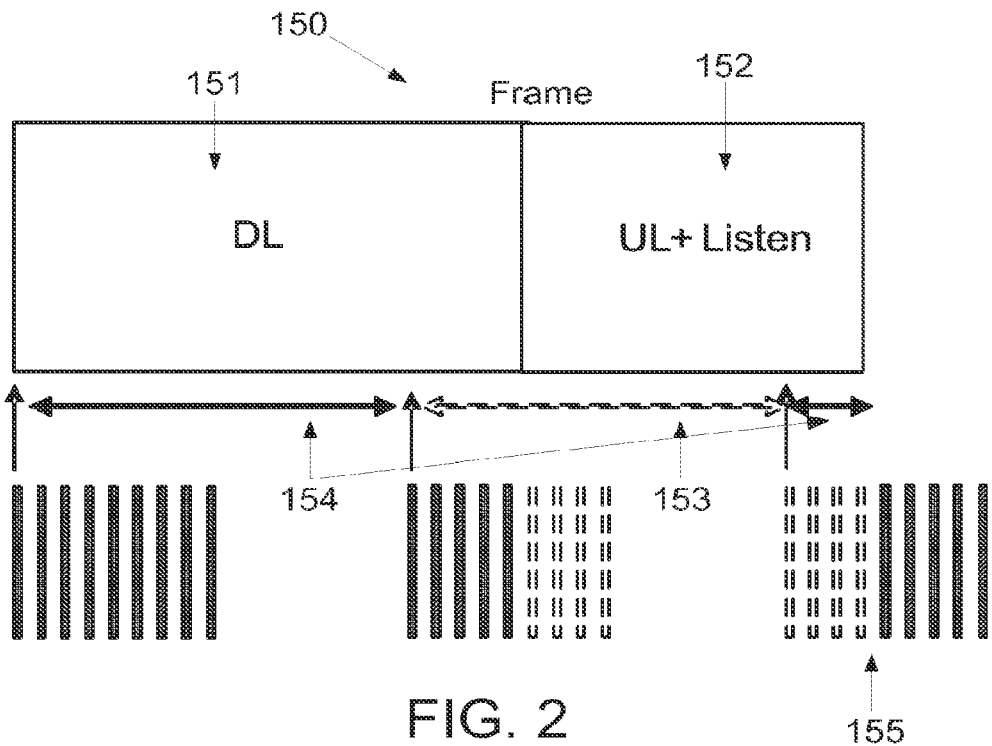
FIG. 2 is a schematic illustration of a frame, an exemplary detection period, and exemplary interferer signal that is received during the frame reception period, according to some embodiments of the present invention.
FIG. 3 is an exemplary table detailing a calculation of a detection period for an exemplary federal communications commission (FCC) radar type 6 radar signal pattern, according to some embodiments of the present invention.

Reference is now also made to FIG. 2, which is a schematic illustration of a frame having a DL 151 and a UL 152, an exemplary detection period 153, and exemplary interferer signal that is received during the frame reception period, according to some embodiments of the present invention.

Optionally, the silent slots are allocated in a detection period having a minimal length. Optionally, the detection period is calculated as follows:

First, the start point of the radar pulse burst is assumed to be uniformly distributed within the frame. Another assumption is that 4 pulses or more are required for burst detection. For example, in FIG. 2, the broken line represents the exemplary detection period 153 period and the unbroken lines 154 represents missing period in which signals are not detected. The detection probability is the ratio between the detection period and the missing period.

Optionally, the detection probability is defined between 60% and 70%, for instance according to the requirements of the ETSI and/or the FCC standards, which are incorporated herein by reference. For example, FIG. 3 depicts an exemplary table that details a calculation of a detection period for a radar signal pattern as defined in federal communications commission (FCC) radar type 6, according to some embodiments of the present invention. Similar calculation is presented in FIG. 4 detailing a calculation of a detection period for a radio pattern as defined in the European telecommunications standards institute (ETSI) FH-2, according to some embodiments of the present invention.

Optionally, the length of the intercepted signal that is required for detection equals to a multiplication between the pulse that is required for detection, minus 1, and the PRI+the pulse width.

Optionally, the starting point of the detection period is set by reducing the total burst length from the sum of the length of the DL sub frame and the signal's length that is required for detection.

Optionally, the ending point of the detection period is set by reducing the length of the signal that is required for detection from the total length of the frame.

These calculations allow calculating the detection probability, for example by dividing the increment between the starting point and the ending point of the detection period with the length of the frame. By setting the detection probability according to a required value, the silent slots, in each one of the sub frames, referred to herein as Listen_Zones values, may be defined. For example, since for TDD ratio of 29:18, the UL slots are fixed at 18, the silent slots are derived from calculating the sum of UL and Listen_Zones value.

Now, as shown at 103, signals are intercepted during the silent slots. Optionally, the frequency for intercepted transmission signals is selected according to the radar signal detection requirements in various regulation authorities around the world, for example ETSI and FCC standards. For instance, the detection is defined for channels whose nominal bandwidth falls partly or completely within selected frequency ranges, for example between 5250 MHz and 5350 MHz, 5470 MHz and 5725 MHz, 5725 MHz and 5850 MHz, and/or any frequency range between 400 MHz and 10.5 GHz.

Now, as shown at 104, interferer signals are detected and optionally classified according to the intercepted signals. Optionally, the detection is performed according to known characteristics of selected radar patterns. In exemplary embodiments of the present invention, the characteristics of the Radar patterns are defined according to FCC standard No. FCC-06-96A1, which is incorporated herein by reference and detailed in FIG. 5. Additionally or alternatively, the Radar patterns to be detected are the Radar patterns which are defined in ETSI EN 301893 v1.5.1p standard, which is incorporated herein by reference and detailed in FIG. 6. Additionally or alternatively, the radar patterns to be detected are the radar patterns which are defined in ETSI EN 301893 v1.5.1p standard EN 302502 v1.2.1 p standard, which are incorporated herein by reference and detailed in FIGS. 7 and 8. The values presented in these figures are based on a simulation ran 15 symbol length signals under 100% and 30% loading in quadrature phase-shift keying (QPSK), 16 quadrature amplitude modulation (QAM) and 64 QAM with UL signal to noise ratio (SNR) of 5, 7, 10, 13, 16, 20 and 24 dB and an exemplary interferer signal, a radar signal having 5 dB Radar to Signal ratio, CW pulse, 150 usec PRI, 11 pulses per UL, and a pulse duration of 0.5, 0.8, 1, 2 and up to 100 usec.

Optionally, the detection includes measuring the energy of the intercepted transmission signals in each silent slot. Optionally, the measurement is performed intermittently, for example every 40 nsec, which are 16 times in a silent slot of 640 nsec.

Optionally, interferer signals, such as radar signals, are detected according to the width of an intercepted signal. Optionally, the width is detected using a counter that counts the number of pulses having a value that is higher than a preconfigured value. In such an embodiment, the counter is incremented each time the level of the measured signal crosses the preconfigured value. For example, 24 increments are indicative of an interferer pulse width of 1 us and 14 increments are indicative of an interferer pulse width of 0.56 us. It should be noted that such a counter does not require a substantial memory allocation and/or a substantial computation power.

Additionally or alternatively, interferer signals are identified according to a signal pattern, for example using one or more histograms. For example, 64 counters are used for measuring energy intercepted during a silent slot of 0.64 us. In this example, the 64 counters represent −36 decibel (dB) referenced to one milliwatt (dBm) to −100 dBm received signal strength indication (RSSI) levels. In each measurement, for example every 40 ns, the relevant counter representing the measured value is incremented. Optionally, each 0.64 us, a median of the counters is calculated to find the received signal value.

Optionally, the repetition of the pulses is measured using the aforementioned methods if a preconfigured value has not been crossed. Optionally, the aforementioned methods facilitate the measuring of pulses crossing one or more measuring silent slots of 0.64 usec.

Optionally, interferer signals are detected according to the pulse and/or the pattern of the intercepted signals. Reference is now also made to FIG. 9, which is a schematic illustration of functional blocks of a pulse detector for detecting interferer signals by probing pulses of intercepted signals, according to some embodiments of the present invention.

Optionally, the detection of the pulse detector is implemented by circuitry, such as a field-programmable gate array (FPGA) or a System on a Chip (SOC) that is controlled by the hosting radio port unit, for example a CPE and/or a BS, and may be referred to herein as an interferer pulse Detection Circuitry.

Optionally, the pulse detection process and the pattern detection process are performed for signals received by a number of radio units, optionally simultaneity. In such an embodiment, the Interferer pulse Detection Circuitry is located on a front-end unit (FEU) that is operated on a parallel of a connection matrix, between two system of chips (SOCs) and two Radio units, for example as shown in numeral 451 at FIG. 10. The pattern detection may be performed by an additional computation power located in the SOCs, and/or internally, optionally on the fly, by the CPU of the FEU.

First, as shown at 201, signals are received at the digital front end (DFE).

Optionally, the received signal is filtered, for instance using a low-pass filter (LPF). For example, if the signal sampling rate is higher than the analyzed sampling rate, the signal is filtered using an infinite impulse response (IIR) filter, for example as follows:

$$y(n)=(423\ x(n)+846\ x(n-1)+423\ x(n-2)-757\ y(n-1)+401\ y(n-2))*2^{-9}$$

In such an embodiment, signals intercepted in a signal sampling rate of 25 MHz or more may be filtered to emulate a signal sampling rate of 10 MHz.

Figure 11:
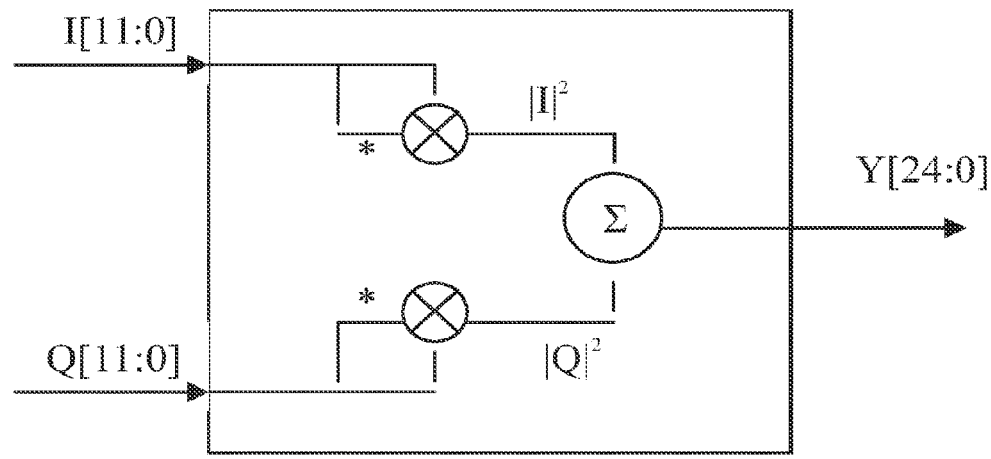
FIG. 11 is an electric circuit of a signal envelope module, according to some embodiments of the present invention.

Then, the real envelope of the received signal is calculated, for example, as shown at 203, by a signal envelope module. In use, the signal envelope module receives signal data, optionally translated to I/Q data, which is indicative of changes in magnitude, amplitude, and/or phase of the sine wave of the received signal. I/Q data is received from the DFE, and optionally sampled by 25 MHz. The I/Q data is optionally represented with 12 bits width. The signal envelope module calculates an output according to $Y=I^2+Q^2$, optionally using an electric circuit, for example as shown at FIG. 11. The output data is optionally 25 bits width.

Now, high frequency fluctuations are removed, for example by an average filter module, as shown at 204. The average filter calculates the power of the signal over 16 samples and accordingly removes the high frequency fluctuations. The average filter implemented by an interpolator, such as a cascaded integrator-comb (CIC) filter, with 16 taps. The input data rate is optionally 25 MHz and the data width is optionally 25 bits, for allowing the reception of the signal envelope module. The output data rate is optionally 25 MHz, and the data width is optionally 25 bits.

Figure 12:
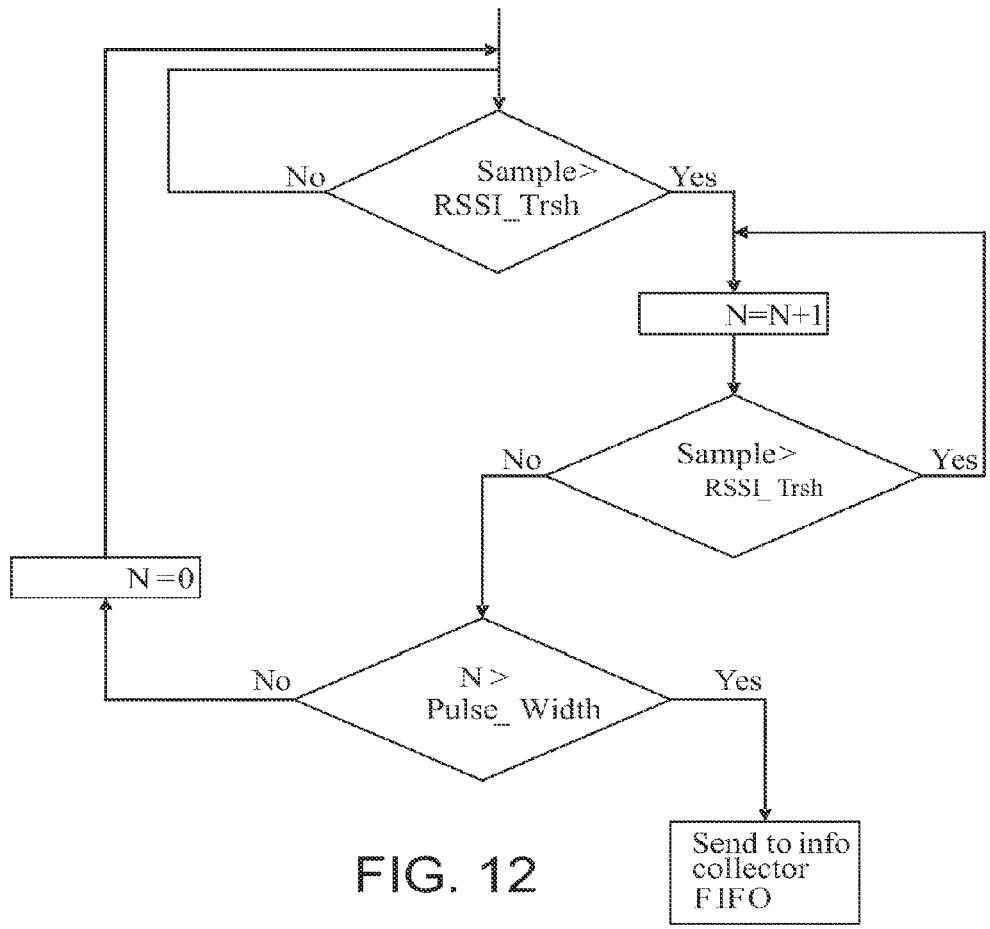
FIG. 12 is a state machine (SM) for analyzing the power of the received radio signal, according to some embodiments of the present invention.

Now, the power of the received radio signal is detected and analyzed, for example by a state machine (SM), for example as shown at 205. The SM, referred to herein as a detection decision SM or a power detector, which is optionally defined as depicted in FIG. 12, receives the outputs of the average filter in samples of 25 MHz and outputs detection data regarding the received radio signals. The outputs are indicative to whether the received radio signal passes a received signal strength indication (RSSI) threshold (RSSI_Treshold) and/or pulse width (Pulse_Width) criteria. The radio signal is received from the hosting radio port unit, for example from a CPE or a BS, and the detection data is forwarded back thereto. Optionally, the time stamp of the pulse starting interval, for example the timing of a numerically-controlled oscillator (NCO) value, and the pulse duration, for example samples of 25 MHz, are forwarded to the hosting radio port unit. For example, for successful detection of the pulse of the received radio signal that is more than 0.8 usec, the RSSI_Tresh is the Receive Signal Strength (RSS) of the pulse −4.5 dB and the Pulse_Width is 4 samples. In such an exemplary embodiment, the probability of miss detection is approximately 13% and the probability of false alarm is approximately 9%. In another example, a pulse of a received radio signal of more than 0.5 usec may be detected by defining the RSSI_Tresh as RSS-6.7 dB and the Pulse_Width as 2 samples.

The detection decision SM outputs are forwarded to an information (info) collector, for example as shown at 206. The info collector is optionally implemented by 3 first in first out (FIFO) elements. The info collector keeps a plurality of info entries, optionally up to 128. Each info entry includes time stamp and/or pulse duration, optionally as defined below. The time stamp includes the frame time counter (FTC) time, denoted herein as FTC_TIME, optionally represented by a 16 bits width data unit and a frame number, optionally represented as a 4 bits width data unit. The pulse duration is optionally represented as a 12 bits width data unit. The RSSI is optionally represented as 10 bits width data unit. In use, first FIFO stores the FTC_TIME, the second FIFO stores the frame counter and the pulse duration, optionally respectively as 4 MSB and 12 LSB, and the third FIFO stores the RSSI of the detected pulse. The detection decision SM outputs are stored in the info entries. Optionally, the updating of each info entry increments a counter by 1 and the reading of each entry by the hosting radio port unit decreases the counter by 1. For example, if the Host-FPGA interface is 16 bits width, the hosting radio port unit may read the data stored by the info collector as follows:

1. read the counter that represents the number of detected pulses of the Info collector;
2. read the Pulse duration and the frame number from the respective FIFO element;
3. read the FTC_TIME from the respective FIFO element;
4. read the RSSI from the respective FIFO element; snd
5. repeat 2, 3, 4 as long as the counter is larger than 0.

Now, after the info entries have been updated, the info entries are analyzed for detecting radar signals. Optionally, 46875 info entries are managed by the pulse detection mechanism. Each DB entry includes an absolute time stamp in which a respective pulse has been detected and the size of the detected pulse in terms of concurrent samples with RSSI above the RSSI_Tresh.

Optionally, the database is updated every 100 msec with the latest value of the counter, and the oldest entry in the table is being delete so we get a sliding window of receive (RX) RSSI readings, for example as follows:

| Time stamp (usec) | Pulse length (Samples) |
|---|---|
| 100 | 5 |
| 150 | 8 |
| 220 | 8 |
| . | . |
| . | . |
| . | . |
| 11450 | 2 |

The pattern detection algorithm calculates the interval between time stamps of consecutive entries in the database, which may be referred to herein as primary rate interface (PRI), the pulse width, for example by multiplying the pulse length by the sampling interval, and the number of pulses per burst. Optionally, one or more occurrences of miss detection and one or more occurrences of false alarm are taken into account. Identical parameters are than searched for in the info entries. Such parameters are indicative of possible radar signals.

Optionally, the detection of interferer signals, the classification of the interferer signals according to one or more characteristics, and/or data pertaining to the detected signals is documented. For example, once interferer signal, such as a radar signal, is detected, the channel is added into the distributed file system (DFS) Channels table, for example as illustrated FIG. 13. Optionally, the time stamp is converted to a real calendar time and date in order to allow tracking radio signals.

Optionally, in order to regulate the access to a communication media, according to IEEE.802.16h requirements, a carrier sense multiple access with collision detection (CSMA/CD) protocol is implemented.

In such an embodiment, the 10 ms or more are free to allow WiFi systems to use the media communication. In such an embodiment, the silent slots may be allocated as part of the free period that allows Wi-Fi™ systems to use the media communication. Optionally, 20 ms TDD frames are used wherein the last 10 ms of the frame is defined as a silence zone. For that case a TDD ratio of DL 25%, UL 75% is allocated where the UL zone is occupied by 25% of the frame and 50% of the frame is defined as silence zone that gives an opportunity to carriers sensing based systems, such as WiFi ™ system to share a common media connection with a device implementing the method, for example a WiMAX™ BS. It should be noted that any frame with a DL/UL TDD ratio that occupies only 50% of the frame may be used.

Now, as shown at 105, the communication may be adjusted according to the detection and/or classification of the interferer signals. For example, the interferer signal detection may trigger a DFS and/or a DCS and/or performed during the implementation of such a scheme.

According to some embodiments of the present invention, the radar detection is performed in one or more channels of a multichannel transmission so as to allow a DCS, for example for interference mitigation. In such an embodiment, the above mentioned method is separately operated on various channels, for example 4.

Figure 14:
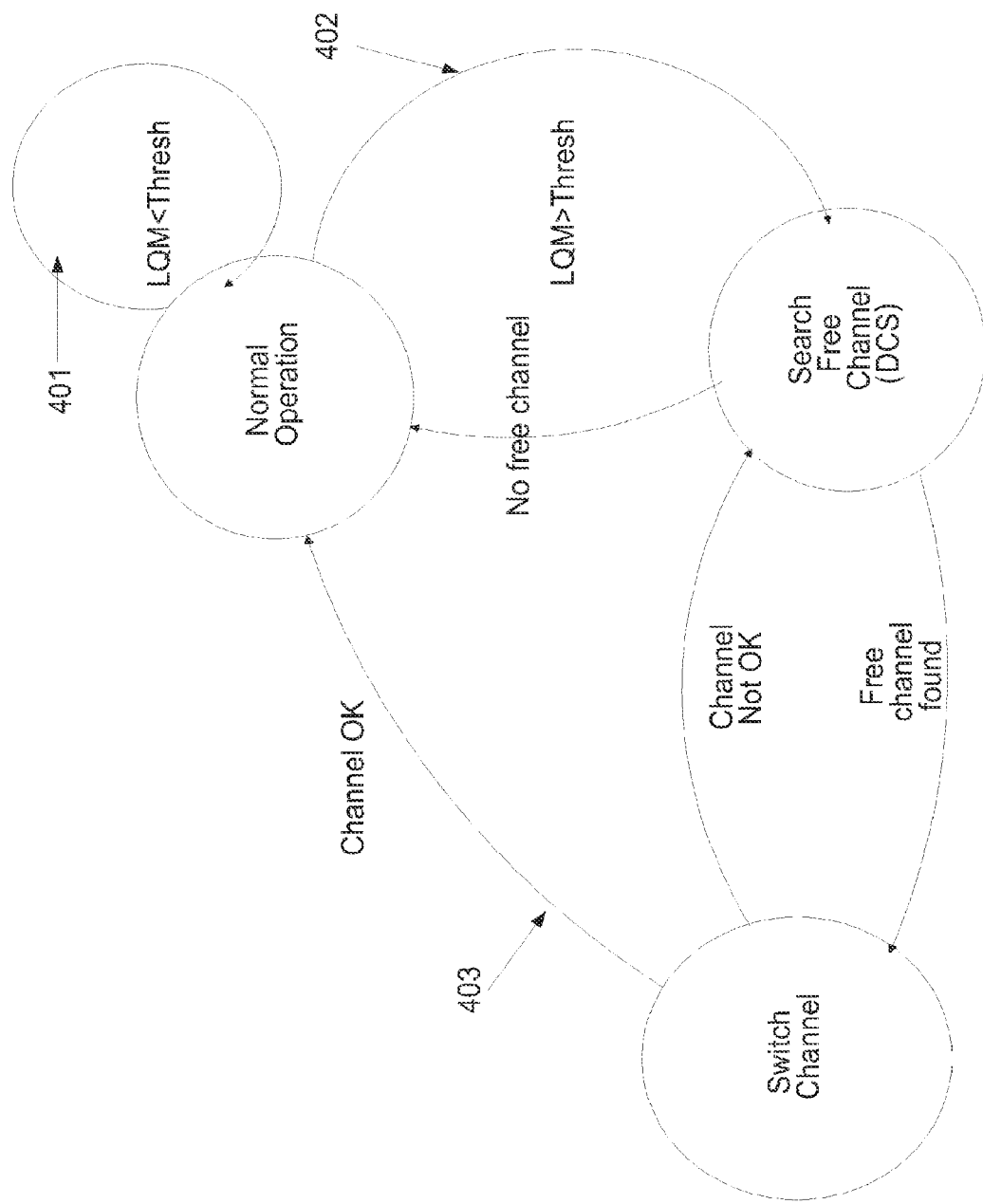
FIG. 14 is a flowchart of interference detection and dynamic channel selection, according to some embodiments of the present invention.

For example, the method may be used for selecting a new channel during a link quality monitoring (LQM), for example as depicted in FIG. 14. As shown at 401, a channel is used as long as a monitored interference and/or noise are below a certain threshold. If the interference exceeds the threshold, as shown at 402, the DCS is used for selecting a new channel. As shown at 403, if the selected channel is suitable, the channel is used as the operational channel.

Optionally, random interception symbols and/or silence slots are allocated in the channel to allow sensing interference noise of other synchronized TDD base stations (BSs). In such a manner, channel noise level may be sensed in transmit/receive transition gap (TTG) time and allow propagation delay compensation for minimum capacity loss and channel noise estimation.

Optionally, the channels are periodically scanned to allow the powering up a channel that is actually used and adjacent channels, up to n configurable frequencies.

Such scanning allows analyzing the spectrum of a number of channels, for example actual and/or adjacent, by performing RSSI measurements of scanned frequencies.

Additionally or alternatively, the measurements may be used for estimating the quality of the channels by measuring noise level in run time and/or during power up.

Optionally, the measurements are used for calculating the link budget of the transmission, optionally considering the transmit power, the cell radius and/or distance per user, the antenna height, and/or the deployment environment, for example Urban, sub-urban, and/or rural.

Optionally, the measurements are used for calculating the link quality, for example by calculating the applicable RSSI values, optionally in the light of the distance from the relevant BS, versus the measured noise. In such an embodiment, the applicable carrier to interference-plus-noise ratio (CINR), throughput and/or the service quality may be calculated for each subscriber.

Additionally or alternatively, a BS may change and/or select a frequency by evaluating a total applicable service quality of a certain channel according to a total of applicable throughputs and/or a service quality, optionally in relation to a planed throughput.

As described above, the silent slots are allocated during the UL and the DL sub frames. Therefore, packet error ratio of UL and/or DL may be separately calculated. Such a packet error ratio may be used as interference criteria in addition the interference signal level.

Optionally, a randomize formula is used over a configurable percent of quietest frequencies for selecting a channel, for example in response to a channel quality failure.

It is expected that during the life of a patent maturing from this application many relevant systems and methods will be developed and the scope of the term a communication channel, a CPE, a BS, and a frame is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method of detecting interference in a wireless communication system where a base station communicates with radio port units over a communication channel, comprising:
   communicating wireless signals between the base station and the radio port units using frames, each frame including an uplink (UL) subframe with UL slots and a downlink (DL) subframe with DL slots, wherein the UL subframe is transmitted from a radio port unit to the base station over a single UL frequency channel;
   allocating one or more silent slots in at least one of the frames;
   intercepting an interferer signal during at least one of the one or more silent slots;
   determining a measurement of the interferer signal; and
   switching to another UL frequency channel in response to detecting an interferer signal.

2. A method as claimed in claim 1, wherein the one or more silent slots are provided in the DL subframe, while maintaining a configured ratio between the number of UL slots and DL slots.

3. A method as claimed in claim 1, wherein the one or more silent slots are provided in the UL subframe, while maintaining a configured ratio between the number of UL slots and DL slots.

4. A method as claimed in claim 1, further comprising detecting the interferer signal based on a signal pattern.

5. A method as claimed in claim 1, wherein determining the measurement of the interferer signal is performed using signal patterns.

6. A method as claimed in claim 1, wherein determining the measurement of the interferer signal comprises measuring the energy during the at least one of the silent slots in which the interferer signal is intercepted.

7. A method as claimed in claim 1, wherein determining the measurement of the interferer signal is performed using received signal strength indication (RSSI).

8. A method as claimed in claim 1, wherein the measurement of the interferer signal provides a link quality measure.

9. A method as claimed in claim 8, further comprising:
   establishing a link quality threshold for the interferer signal; and
   comparing the link quality measure with the link quality threshold.

10. A method as claimed in claim 9, further comprising when the link quality measure is lower than the link quality threshold:
    identifying a free communication channel; and
    switching communication from the communication channel to the free communication channel.

11. A method as claimed in claim 9, wherein the link quality measure includes carrier to interference-plus-noise ratio (CINR).

12. A method as claimed in claim 11, wherein the link quality measure further includes UL to DL packet error ratio in addition to the interference signal level.

13. A method as claimed in claim 1, wherein a first silent slot of the one or more silent slots is provided in the DL subframe and a second silent slot of the one or more silent slots is provided in the UL subframe, while maintaining a configured ratio between the number of UL slots and DL slots.

14. A method as claimed in claim 1, further comprising adding data pertaining to the interferer signal in a central table for distribution.

15. A method as claimed in claim 14, wherein the data pertaining to the interferer signal includes a channel identification and a time stamp.

16. A method as claimed in claim 14, wherein the data pertaining to the interferer signal includes a signal pattern.

17. A base station communicating with radio port units in a wireless communication system, comprising:
receiver-transmitter circuitry;
an antenna for transmitting and receiving wireless signals using a frame with an uplink (UL) subframe and a downlink (DL) subframe;
an interferer signal module for detecting an interferer signal during at least one silent slot provided in the frame,
wherein the at least one silent slot is provided in the DL subframe, while maintaining a configured ratio between the number of UL slots and DL slots.

18. A base station as claimed in claim 17, wherein at least one further silent slot is provided in the UL subframe, while maintaining a configured ratio between the number of UL slots and DL slots.

19. A base station as claimed in claim 17, wherein the at least one silent slot comprises a first silent slot provided in the UL subframe and a second silent slot provided in the DL subframe.

20. A base station as claimed in claim 17, further comprising a communication adjustment module for changing transmission from a current communication channel to a new communication channel in response to detection of the interferer signal.

21. A base station communicating with radio port units in a wireless communication system, comprising:
receiver-transmitter circuitry;
an antenna for transmitting and receiving wireless signals using a frame with an uplink (UL) subframe and a downlink (DL) subframe;
an interferer signal module for detecting an interferer signal during at least one silent slot provided in the frame; and
a communication adjustment module for changing transmission from a current communication channel to a new communication channel in response to detection of the interferer signal.

22. A base station as claimed in claim 21, wherein the at least one silent slot comprises a first silent slot provided in the UT subframe and a second silent slot provided in the DL subframe.

23. A base station as claimed in claim 21, wherein the at least one silent slot is provided in the DL subframe, while maintaining a configured ratio between the number of UT slots and DL slots.

* * * * *